United States Patent
Ikeuchi et al.

(10) Patent No.: US 10,586,981 B2
(45) Date of Patent: Mar. 10, 2020

(54) POSITIVE ELECTRODE FOR A BATTERY AND BATTERY INCLUDING POSITIVE ELECTRODE ACTIVE MATERIAL

(71) Applicant: Panasonic Intellectual Property Management Co., Ltd., Osaka (JP)

(72) Inventors: Issei Ikeuchi, Hyogo (JP); Ryuichi Natsui, Osaka (JP); Kensuke Nakura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 226 days.

(21) Appl. No.: 15/647,265

(22) Filed: Jul. 12, 2017

(65) Prior Publication Data

US 2018/0090757 A1   Mar. 29, 2018

(30) Foreign Application Priority Data

Sep. 26, 2016   (JP) ................. 2016-186420

(51) Int. Cl.

| | | |
|---|---|---|
| *H01M 4/485* | (2010.01) | |
| *H01M 4/58* | (2010.01) | |
| *H01M 4/525* | (2010.01) | |
| *H01M 4/38* | (2006.01) | |
| *C01G 45/12* | (2006.01) | |
| *H01M 4/505* | (2010.01) | |
| *H01M 10/0525* | (2010.01) | |
| *H01M 10/052* | (2010.01) | |
| *H01M 4/02* | (2006.01) | |

(52) U.S. Cl.
CPC .......... *H01M 4/485* (2013.01); *C01G 45/125* (2013.01); *C01G 45/1228* (2013.01); *H01M 4/386* (2013.01); *H01M 4/505* (2013.01); *H01M 4/525* (2013.01); *H01M 4/5805* (2013.01); *H01M 10/0525* (2013.01); *C01P 2002/72* (2013.01); *C01P 2002/76* (2013.01); *C01P 2006/40* (2013.01); *H01M 10/052* (2013.01); *H01M 2004/028* (2013.01)

(58) Field of Classification Search
CPC ...... H01M 4/485; H01M 4/505; H01M 4/525; H01M 4/5805; H01M 4/386; H01M 10/0525; H01M 10/052; H01M 2004/028; C01G 45/1228; C01G 45/125; C01P 2002/72; C01P 2002/76; C01P 2006/40
See application file for complete search history.

(56) References Cited

U.S. PATENT DOCUMENTS

2016/0049640 A1    2/2016  Takeuchi et al.
2018/0375096 A1*  12/2018  Aoki .................... H01M 4/525

FOREIGN PATENT DOCUMENTS

WO         2014/156153     10/2014
WO      WO 2017/110063   *  6/2017

* cited by examiner

*Primary Examiner* — Laura Weiner
(74) *Attorney, Agent, or Firm* — McDermott Will & Emery LLP

(57) ABSTRACT

A positive electrode active material for a battery, the positive electrode active material comprising a compound having a crystal structure of space group Fm-3m and represented by composition formula (1): $Li_xMe1_\alpha Me2_\beta O_2$ ... (1). In the formula, Me1 represents one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er, Me2 represents one or more elements selected from the group consisting of B, Si, and P, and the following conditions are met: $0<\alpha$; $0<\beta$; $\alpha+\beta=y$; $0.5 \leq x/y \leq 3.0$; and $1.5 \leq x+y \leq 2.3$.

12 Claims, 1 Drawing Sheet

POSITIVE ELECTRODE FOR A BATTERY AND BATTERY INCLUDING POSITIVE ELECTRODE ACTIVE MATERIAL

BACKGROUND

1. Technical Field

The present disclosure relates to a positive electrode active material for a battery and to a battery that includes a positive electrode active material.

2. Description of the Related Art

International Publication No. 2014/156153 discloses a positive electrode active material having a crystal structure of space group Fm-3m and represented by a formula $Li_{1+x}Nb_yMe_zA_pO_2$ (where Me represents one or more transition metals including Fe and/or Mn, $0<x<1$, $0<y<0.5$, $0.25 \le z<1$, A represents any element other than Nb and Me, and $0 \le p \le 0.2$).

SUMMARY

In the related art, there is a need for a battery having a high energy density.

In one general aspect, the techniques disclosed here feature a positive electrode active material for a battery. The positive electrode active material contains a compound having a crystal structure of space group Fm-3m and represented by composition formula (1): $Li_xMe1_\alpha Me2_\beta O_2$ ... (1). In the formula, Me1 represents one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er, Me2 represents one or more elements selected from the group consisting of B, Si, and P, and the following conditions are met: $0<\alpha$; $\beta<3$; $\alpha+\beta=y$; $0.5 \le x/y \le 3.0$; and $1.5 \le x+y \le 2.3$.

The present disclosure provides a battery that has a high energy density.

It should be noted that general or specific embodiments may be implemented as a positive electrode active material, a battery, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
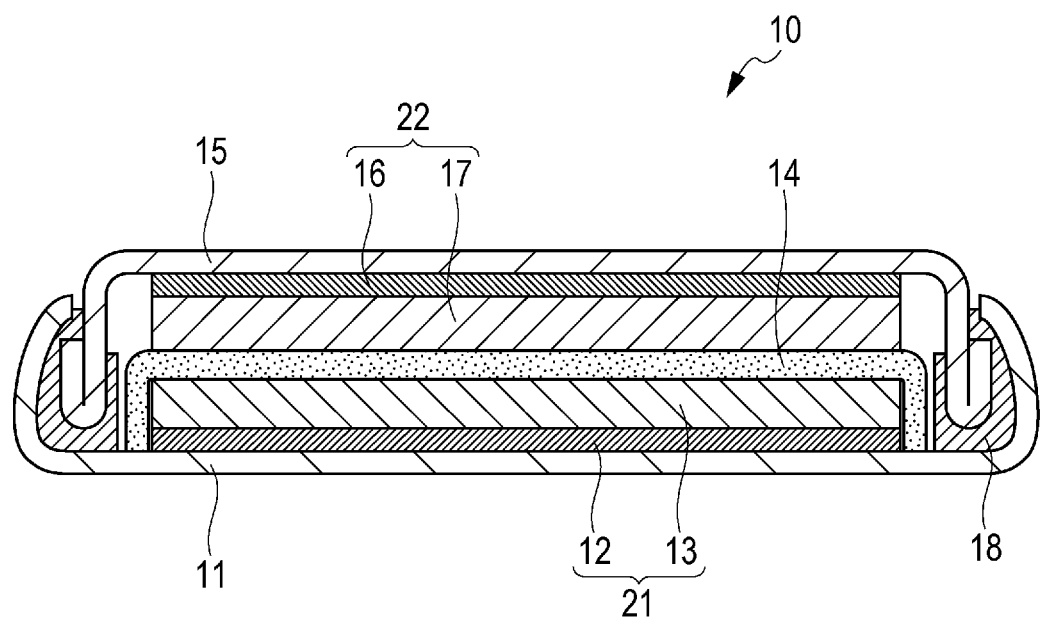
FIG. 1 is a cross-sectional diagram that illustrates a schematic configuration of a battery as an example of a battery according to Embodiment 2.

The following describes some embodiments of the present disclosure.

Embodiment 1

A positive electrode active material according to Embodiment 1 for a battery contains a compound having a crystal structure of space group Fm-3m and represented by composition formula (1).

$$Li_xMe1_\alpha Me2_\beta O_2 \quad (1)$$

In formula (1), Me1 represents one or two or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er.

Me2 represents one or two or more elements selected from the group consisting of B, Si, and P.

In addition to these, this compound in a positive electrode active material according to Embodiment 1 satisfies the following conditions in composition formula (1):

$0<\alpha$;
$0<\beta$;
$\alpha+\beta=y$;
$0.5 \le x/y \le 3.0$; and
$1.5 \le x+y \le 2.3$.

In this configuration, the positive electrode active material gives a battery a high energy density.

Lithium-ion batteries, for example, fabricated with a positive electrode active material containing such a compound has a redox potential (vs. $Li/Li^+$) of approximately 3.3 V.

Making x/y in composition formula (1) less than 0.5 leads to an insufficient capacity of the battery. Under such conditions, the availability of Li in the compound is low, and paths for the diffusion of Li are inhibited.

Making x/y in composition formula (1) more than 3.0 also leads to an insufficient capacity of the battery. Under such conditions, eliminating Li during charging destabilizes the crystal structure of the compound, making the insertion of Li during discharge less efficient.

Making x+y in composition formula (1) less than 1.5 also leads to an insufficient capacity of the battery. Under such conditions, phase separation occurs during the synthesis of the compound, resulting in large amounts of impurities being formed.

Making x+y in composition formula (1) more than 2.3 also leads to an insufficient capacity of the battery. Under such conditions, the compound has an anion-deficient structure, and eliminating Li during charging destabilizes the crystal structure of the compound, making the insertion of Li during discharge less efficient.

A comparative example is a positive electrode active material that contains a compound having a crystal structure of space group Fm-3m and represented by composition formula (1) with Me1 including Mn and Nb and lacking Me2 (i.e., $\beta=0$).

In the positive electrode active material according to Embodiment 1, Me2 in composition formula (1) represents element(s) that readily forms covalent bonds (i.e., one or two or more elements selected from the group consisting of B, Si, and P).

This increases the operating voltage of the battery.

Furthermore, these nonmetals have a low atomic weight compared with metals.

Containing such element(s) with low atomic weights, the positive electrode active material according to Embodiment 1 can be suitably used to produce batteries with high energy densities and high capacities.

In the positive electrode active material according to Embodiment 1, Me2 may include Si.

In this configuration, the positive electrode active material gives the battery a higher energy density and a higher capacity.

In the positive electrode active material according to Embodiment 1, the compound may have a composition formula (1) in which $1<\alpha/\beta$.

In this configuration, too, the positive electrode active material gives the battery a higher energy density and a higher capacity. The compound contains more Me1 than Me2, electrochemically inert element(s), and therefore provides sufficient conducting paths, for electricity to flow. As a result, more Li can be eliminated from the compound.

In the positive electrode active material according to Embodiment 1, the compound may have a composition formula (1) in which $3<\alpha/\beta$.

This configuration makes the energy density and capacity of the battery even higher. In this configuration, the compound contains much more Me1 than Me2, electrochemically inert element(s), and therefore conducting paths are more available than in the above. The amount of Li that can be eliminated is therefore further increased.

In the positive electrode active material according to Embodiment 1, the compound may have a composition formula (1) in which $7\leq\alpha/\beta$.

This configuration makes the energy density and capacity of the battery still higher. In this configuration, the compound contains even much more Me1 than Me2, electrochemically inert element(s), and therefore conducting paths are even more available than in the above. The amount of Li that can be eliminated is therefore still further increased.

In the positive electrode active material according to Embodiment 1, the compound may have a composition formula (1) in which $\alpha/\beta<21$.

In this configuration, too, the positive electrode active material gives the battery a higher energy density and a higher capacity. The amount of Me2, element(s) that readily forms covalent bonds and has a low atomic weight, is sufficiently large compared with that of Me1.

In the positive electrode active material according to Embodiment 1, Me1 can be one element selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er.

Alternatively, in the positive electrode active material according to Embodiment 1, Me1 can be a solid solution containing two or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er.

In the positive electrode active material according to Embodiment 1, furthermore, Me1 can be one or two or more elements selected from the group consisting of Mn, Ni, Co, Fe, Al, Sn, Cu, Mo, Bi, V, Cr, Y, Zr, Zn, Na, K, Ca, Mg, Pt, Au, Ag, Ru, Ta, W, La, Ce, Pr, Sm, Eu, Dy, and Er.

In these configurations, too, the positive electrode active material gives the battery a higher energy density and a higher capacity. Sufficient conducting paths are still available in the compound, and the battery operates at a high voltage.

In the positive electrode active material according to Embodiment 1, some of Li in the compound of composition formula (1) may be replaced with an alkali metal, such as Na or K.

Furthermore, the positive electrode active material according to Embodiment 1 may contain the compound of composition formula (1) as its main component.

In other words, the amount of the compound of composition formula (1) in the positive electrode active material according to Embodiment 1 may be 50% by weight or more.

In these configurations, too, the positive electrode active material gives the battery a higher energy density and a higher capacity.

It should be noted that when its main component is the compound of composition formula (1), the positive electrode active material according to Embodiment 1 may further contain inevitable impurities or substances other than the main component. Such substances include starting materials for and by-products of the synthesis of the compound and decomposition products of the compound.

In the positive electrode active material according to Embodiment 1, the amount of the compound may be, for example, between 90% and 100% by weight relative to the entire positive electrode active material. The positive electrode active material may consist of the compound and inevitable impurities.

In these configurations, too, the positive electrode active material gives the battery a higher energy density and a higher capacity.

In the positive electrode active material according to Embodiment 1, Me1 may include Mn. That is, Me1 may be Mn. Alternatively, Me1 may be a solid solution containing Mn and one or two or more elements selected from the group consisting of Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er.

In this configuration, too, the positive electrode active material gives the battery a higher energy density and a higher capacity.

In the positive electrode active material according to Embodiment 1, the compound may have a composition formula (1) in which $1.0\leq x/y\leq 2.0$.

In this configuration, too, the positive electrode active material gives the battery a higher energy density and a higher capacity.

In the positive electrode active material according to Embodiment 1, the compound may have a composition formula (1) in which $1.5\leq x/y\leq 1.56$.

This configuration makes the energy density and capacity of the battery even higher.

In the compound represented by composition formula (1), it appears that Li, Me1, and Me2 are located at the same site.

The compound of composition formula (1) therefore, when $1.0<x/y$, allows more Li to be inserted thereinto and eliminated therefrom than, for example, $LiMnO_2$, a known positive electrode active material, for a given total amount of Me1 and Me2. Consequently, the compound of composition formula (1), when $1.0<x/y$, can be suitably used to produce lithium-ion batteries that have higher capacities than existing ones.

In the positive electrode active material according to Embodiment 1, the compound may have a composition formula (1) in which $1.9\leq x+y\leq 2.3$.

In this configuration, too, the positive electrode active material gives the battery a higher energy density and a higher capacity.

In the positive electrode active material according to Embodiment 1, the compound may have a composition formula (1) in which $1.9\leq x+y\leq 2.0$ or $2.0\leq x+y\leq 2.3$.

This configuration makes the energy density and capacity of the battery even higher.

Process for the Production of the Compound

The following describes an example of a process for producing this compound as a component of a positive electrode active material according to Embodiment 1.

The compound of composition formula (1) can be produced by, for example, the following method.

A material containing Li, a material containing O, a material containing Me1, and a material containing Me2 are prepared.

The Li-containing material can be, for example, an oxide, such as $Li_2O$ or $Li_2O_2$; a salt, such as $Li_2CO_3$ or $LiOH$; or a lithium-transition metal oxide, such as $LiMeO_2$ or $LiMe_2O_4$.

The Me1-containing material can be, for example, an oxide in any oxidation state, such as $Me1_2O_3$; a salt, such as $Me1CO_3$ or $Me1NO_3$; a hydroxide, such as $Me1(OH)_2$ or $Me1OOH$; or a lithium-transition metal oxide, such as $LiMe1O_2$ or $LiMe1_2O_4$.

When Me1 is Mn, for example, the Mn-containing material can be a manganese oxide in any oxidation state such as $Mn_2O_3$, a salt such as $MnCO_3$ or $MnNO_3$, a hydroxide such as $Mn(OH)_2$ or $MnOOH$, a lithium-transition metal oxide such as $LiMnO_2$ or $LiMn_2O_4$, etc.

The Me2-containing material can be, for example, $Li_4Me2O_4$, $Li_3Me2O_4$, or $LiMe2O_2$.

The materials are then weighed out. The materials can be in any molar ratio as long as the conditions given under composition formula (1) are met.

The manufacturer can therefore change "x, α, β, and y" in composition formula (1) within the ranges specified under composition formula (1).

The materials are then mixed through, for example, a dry process or a wet process and mechanochemically reacted for at least 10 hours to give a compound of composition formula (1). This can be performed using, for example, a mixer such as a ball mill.

Selecting appropriate starting materials and appropriate conditions for the mixing of the starting materials yields a compound of composition formula (1) substantially without any by-product.

Using a lithium transition metal oxide as a precursor further reduces the energy requirement for the mixing of the elements to be achieved, giving the resulting compound of composition formula (1) a higher purity.

The composition of the resulting compound of composition formula (1) can be determined by, for example, ICP emission spectrometry and inert gas fusion-infrared absorptiometry.

The space group of the crystal structure is then determined by powder X-ray diffractometry. In this way, the compound of composition formula (1) can be identified.

In an aspect of Embodiment 1, therefore, the process for producing a positive electrode active material for a battery includes (a) preparing starting materials and (b) mechanochemically reacting the starting materials to obtain the positive electrode active material for a battery.

Step (a) may include mixing a Li-containing material, an Me1-containing material, and an Me2-containing material in proportions such that the molar ratio of Li to Me1 plus Me2 is 0.5 or more and 3.0 or less to prepare a mixture of the materials.

In such a case, step (a) may include producing, by a known method, a lithium-transition metal oxide for use as a starting material.

Furthermore, step (a) may include mixing a Li-containing material, an Me1-containing material, and an Me2-containing material in proportions such that the molar ratio of Li to Me1 plus Me2 is 1.0 or more and 2.0 or less to prepare a mixture of the materials.

Step (b) may include mechanochemically reacting the starting materials using a ball mill.

As can be seen from the foregoing, the compound of composition formula (1) can be synthesized by mechanochemically reacting precursors (e.g., $Li_2O$, transition metal oxides, and/or lithium-transition metal composites) using a planetary ball mill.

Selecting appropriate proportions of the precursors leads to more Li atoms to be contained in the finished compound.

Embodiment 2

The following describes Embodiment 2. What has already been described in Embodiment 1 will be omitted where appropriate.

A battery according to Embodiment 2 includes a positive electrode, a negative electrode, and an electrolyte. The positive electrode contains a positive electrode active material according to Embodiment 1.

This configuration provides a battery that has a high energy density.

The battery according to Embodiment 2 can be configured as, for example, a lithium-ion secondary battery, a nonaqueous-electrolyte secondary battery, or a solid-electrolyte secondary battery.

That is, the negative electrode, for example, in a battery according to Embodiment 2 may contain a negative electrode active material capable of storing and releasing lithium.

Likewise, the electrolyte in a battery according to Embodiment 2 may be, for example, a nonaqueous electrolyte (e.g., a nonaqueous liquid electrolyte).

Alternatively, the electrolyte in a battery according to Embodiment 2 may be, for example, a solid electrolyte.

FIG. 1 is a cross-sectional diagram that illustrates a schematic configuration of a battery 10 as an example of a battery according to Embodiment 2.

As illustrated in FIG. 1, the battery 10 includes a positive electrode 21, a negative electrode 22, a separator 14, a case 11, a top plate 15, and a gasket 18.

The separator 14 is located between the positive electrode 21 and the negative electrode 22.

The positive electrode 21, the negative electrode 22, and the separator 14 are impregnated with, for example, a nonaqueous electrolyte (e.g., a nonaqueous liquid electrolyte).

The positive electrode 21, the negative electrode 22, and the separator 14 form an electrode group.

The electrode group is housed in the case 11.

The gasket 18 and the top plate 15 seal the case 11.

The positive electrode 21 includes a positive electrode current collector 12 and a positive electrode active material layer 13 on the positive electrode current collector 12.

The positive electrode current collector 12 is made of, for example, a metallic material (e.g., aluminum, stainless steel, or an aluminum alloy).

The positive electrode current collector 12 is optional, and the case 11 alone can serve as a positive electrode current collector.

The positive electrode active material layer 13 contains a positive electrode active material according to Embodiment 1.

The positive electrode active material layer 13 may optionally contain, for example, additives (e.g., a conductive agent, an ion conductor, and a binder).

The negative electrode 22 includes a negative electrode current collector 16 and a negative electrode active material layer 17 under the negative electrode current collector 16.

The negative electrode current collector 16 is made of, for example, a metallic material (e.g., aluminum, stainless steel, or an aluminum alloy).

The negative electrode current collector 16 is optional, and the top plate 15 alone can serve as a negative electrode current collector.

The negative electrode active material layer 17 contains a negative electrode active material.

The negative electrode active material layer 17 may optionally contain, for example, additives (e.g., a conductive agent, an ion conductor, and a binder).

The negative electrode active material can be, for example, a metallic material, a carbon material, an oxide, a nitride, a tin compound, or a silicon compound.

The metallic material can be a pure metal or an alloy. Examples of metallic materials include metallic lithium and lithium alloys.

Examples of carbon materials include natural graphite, coke, graphitizing carbon, carbon fiber, spherical carbon, artificial graphite, and amorphous carbon.

To give the battery a larger capacity per unit volume, the manufacturer can use silicon (Si), tin (Sn), a silicon compound, or a tin compound. If a silicon or tin compound is used, it can be in the form of an alloy or a solid solution.

An example of a silicon compound is $SiO_x$ ($0.05<x<1.95$). Compounds (alloys or solid solutions) obtained by replacing part of silicon in $SiO_x$ with one or more other elements can also be used.

The one or more replacing elements are selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of tin compounds include $Ni_2Sn_4$, $Mg_2Sn$, $SnO_x$ ($0<x<2$), $SnO_2$, and $SnSiO_3$. The manufacturer can use one tin compound selected from these alone, and can also use a combination of two or more tin compounds selected from these.

The shape of the negative electrode active material is not critical. The negative electrode active material may have any known shape (particles, fibers, etc.).

The method for loading lithium into (or making lithium occluded in) the negative electrode active material layer 17 is not critical either. Specific examples of methods used to do this include (a) depositing a layer of lithium on the negative electrode active material layer 17 using a gas-phase process such as vacuum deposition and (b) heating a foil of metallic lithium and the negative electrode active material layer 17 with one on the other. In both methods, heat diffuses lithium into the negative electrode active material layer 17. The manufacturer can also make lithium occluded in the negative electrode active material layer 17 through an electrochemical process. In a specific example, the battery is assembled using a lithium-free negative electrode 22 and a foil of metallic lithium (the positive electrode), and then charged so that lithium is occluded in the negative electrode 22.

The binder, if used, in the positive electrode 21 and the negative electrode 22 can be polyvinylidene fluoride, polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyethersulfone, hexafluoropolypropylene, styrene-butadiene rubber, or carboxymethylcellulose, for example. The binder can also be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more of these binders can also be used.

The conductive agent, if used, in the positive electrode 21 and the negative electrode 22 can be graphite, carbon black, conductive fibers, fluorinated graphite, a metallic powder, conductive whiskers, a conductive metal oxide, or an organic conductive material, for example. The graphite can be, for example, natural graphite or artificial graphite. Examples of carbon blacks include acetylene black, Ketjenblack®, channel black, furnace black, lamp black, and thermal black. An example of a metallic powder is an aluminum powder. Examples of conductive whiskers include zinc oxide whiskers and potassium titanium oxide whiskers. An example of a conductive metal oxide is titanium oxide. The organic conductive material can be, for example, a phenylene derivative.

The separator 14 can be a material that has high permeability to ions and a sufficiently high mechanical strength. Examples of such materials include a microporous thin film, woven fabric, and nonwoven fabric. Specifically, it is desirable that the separator 14 be made of a polyolefin, such as polypropylene or polyethylene. A polyolefin separator 14 not only is highly durable but also provides a shutdown function when the battery is exposed to excessive heat. The thickness of the separator 14 is in the range of, for example, 10 to 300 μm (or 10 to 40 μm). The separator 14 can be a single-layer film that contains only a single material. Alternatively, the separator 14 can be a composite film (or a multilayer film) that contains two or more materials. The porosity of the separator 14 is in the range of, for example, 30% to 70% (or 35% to 60%). The term "porosity" refers to the percentage of the total volume of pores in the total volume of the separator 14. The "porosity" is measured by, for example, mercury intrusion porosimetry.

The nonaqueous liquid electrolyte contains a nonaqueous solvent and a lithium salt dissolved in the nonaqueous solvent.

The nonaqueous solvent can be, for example, a cyclic or linear carbonate, a cyclic or linear ether, a cyclic or linear ester, or a fluorinated solvent.

Examples of cyclic carbonates include ethylene carbonate, propylene carbonate, and butylene carbonate.

Examples of linear carbonates include dimethyl carbonate, ethyl methyl carbonate, and diethyl carbonate.

Examples of cyclic ethers include tetrahydrofuran, 1,4-dioxane, and 1,3-dioxolane.

Examples of linear ethers include 1,2-dimethoxyethane and 1,2-diethoxyethane.

An example of a cyclic ester is γ-butyrolactone.

An example of a linear ester is methyl acetate.

Examples of fluorinated solvents include fluoroethylene carbonate, methyl fluoropropionate, fluorobenzene, fluoroethyl methyl carbonate, fluorodimethylene carbonate, and fluoronitrile.

The manufacturer can use one nonaqueous solvent selected from these alone, and can also use a combination of two or more nonaqueous solvents selected from these.

The nonaqueous liquid electrolyte may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents, when contained in the nonaqueous liquid electrolyte, improve the oxidation resistance of the nonaqueous liquid electrolyte.

The improved oxidation resistance allows the battery 10 to operate stably even when charging at a high voltage.

In a battery according to Embodiment 2, the electrolyte can also be a solid electrolyte.

The solid electrolyte can be an organic polymer solid electrolyte, an oxide solid electrolyte, or a sulfide solid electrolyte, for example.

An example of an organic polymer solid electrolyte that can be used is a polymer-lithium salt complex.

The polymer may have ethylene oxide units. Ethylene oxide units give the electrolyte even higher ionic conductivity by allowing a greater amount of lithium salt to be contained therein.

Examples of oxide solid electrolytes that can be used include: NASICON solid electrolytes, typified by $LiTi_2(PO_4)_3$ and its substituted derivatives; $(LaLi)TiO_3$ perovskite solid electrolytes; LISICON solid electrolytes, typified by $Li_{14}ZnGe_4O_{16}$, $Li_4SiO_4$, $LiGeO_4$, and their substituted derivatives; garnet solid electrolytes, typified by $Li_7La_3Zr_2O_{12}$ and its substituted derivatives; $Li_3N$ and its H-substituted derivatives; and $Li_3PO_4$ and its N-substituted derivatives.

Examples of sulfide solid electrolytes that can be used include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. These may contain a dopant such as LiX (where X represents F, Cl, Br, or I), $MO_y$, or $Li_xMO_y$ (where M is any of P, Si, Ge, B, Al, Ga, and In, and x and y are natural numbers).

Of these solid electrolytes, sulfide-containing ones are easy to shape and highly conductive to ions. Using a sulfide solid electrolyte therefore gives the battery a higher energy density.

In particular, $Li_2S$—$P_2S_5$ is electrochemically stable and has a higher ionic conductivity than other sulfide solid electrolytes. Using $Li_2S$—$P_2S_5$ therefore makes the energy density of the battery even higher.

It should be understood that the solid electrolyte layer may contain the aforementioned nonaqueous liquid electrolyte.

A nonaqueous liquid electrolyte, when contained in the solid electrolyte layer, facilitates the exchange of lithium ions between the active materials and the solid electrolyte, giving the battery a higher energy density.

The solid electrolyte layer may contain optional ingredients besides the solid electrolyte, such as a gel electrolyte and an ionic liquid.

The gel electrolyte can be a polymer material impregnated with a nonaqueous liquid electrolyte. Examples of polymer materials that may be used include polyethylene oxide, polyacrylonitrile, polyvinylidene fluoride, polymethyl methacrylate, and polymers with ethylene oxide units bonded thereto.

The cation as a component of the ionic liquid may be, for example, a quaternary salt having aliphatic chains, such as a tetraalkylammonium or a tetraalkylphosphonium; an ammonium having an aliphatic ring, such as pyrrolidinium, morpholinium, imidazolinium, tetrahydropyridinium, piperazinium, or piperidinium; or a nitrogen-containing heterocyclic aromatic cation, such as pyridinium or imidazolium. The anion as a component of the ionic liquid may be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

The lithium salt can be, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$. The manufacturer can use one lithium salt selected from these alone, and can also use a combination of two or more lithium salts selected from these. The concentration of the lithium salt is in the range of, for example, 0.5 to 2 mol/liter.

Batteries according to Embodiment 2 can be configured in various shapes, including coin-shaped, cylindrical, square, sheet-shaped, button-shaped, flat-plate, and multilayer batteries.

EXAMPLES

Example 1

Preparation of Positive Electrode Active Material

A lithium manganese oxide ($Li_2MnO_3$) was obtained by a known method.

The $Li_2MnO_3$, $Li_4SiO_4$, $MnO_2$, and $LiMnO_2$ were weighed out in a molar ratio $Li_2MnO_3/MnO_2/Li_4SiO_4/LiMnO_2$ of 6/1/1/8.

These starting materials were put into a 45-cc zirconia container with an appropriate amount of 5-mm zirconia balls, and the container was tightly sealed in an argon glove box.

The container was removed from the argon glove box, and the contents were processed in a planetary ball mill at 600 rpm for 35 hours.

The resulting compound was analyzed by powder X-ray diffractometry.

Figure 2:
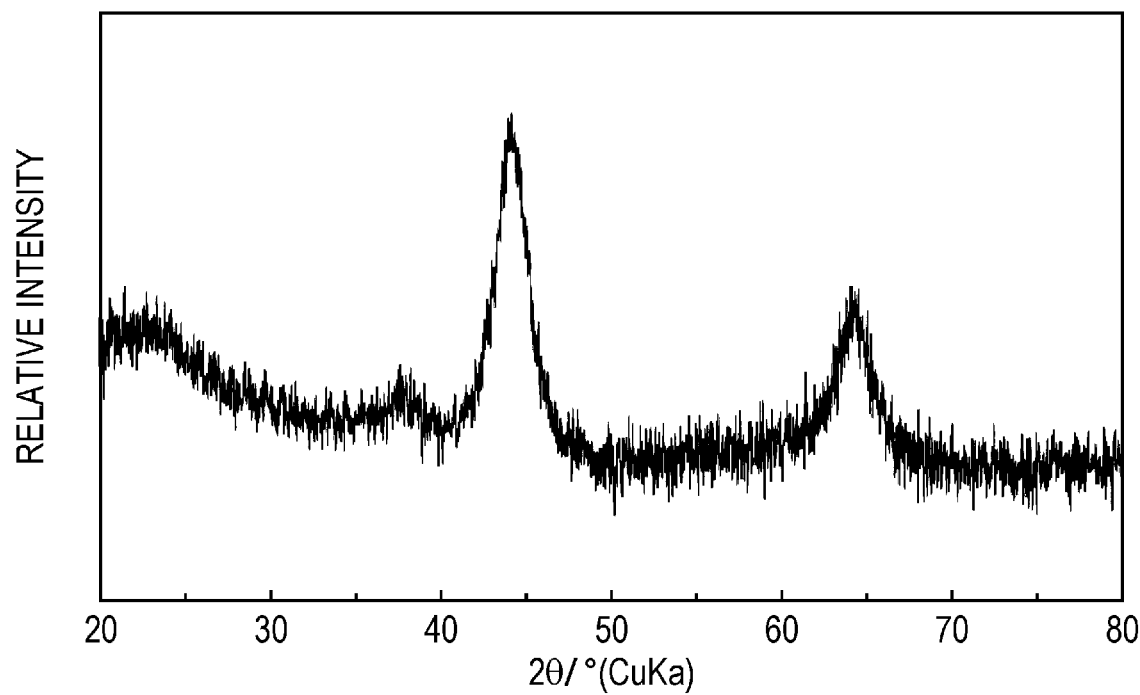
FIG. 2 illustrates a powder X-ray diffraction chart of the positive electrode active material of Example 1.

FIG. 2 is a graphical representation of the results.

The space group of the compound was Fm-3m.

The compound was then compositionally characterized using ICP emission spectrometry and inert gas fusion-infrared absorptiometry.

The composition of the compound was $Li_{1.2}Mn_{0.75}Si_{0.15}O_2$.

Fabrication of Battery

This compound, 70 parts by mass, was mixed with 20 parts by mass of a conductive agent, 10 parts by mass of polyvinylidene fluoride (PVDF), and an appropriate amount of 2-methylpyrrolidone (NMP) to give a positive electrode mixture slurry.

The resulting positive electrode mixture slurry was applied to one side of a 20-μm thick aluminum foil positive electrode current collector.

The applied positive electrode mixture slurry was dried and rolled, giving a 60-μm thick positive electrode plate having a positive electrode active material layer.

This positive electrode plate was cut to give a round disk 12.5 mm in diameter. This disk was used as positive electrode.

Separately, a 300-μm thick foil of metallic lithium was cut to give a round disk 14.0 mm in diameter. This disk was used as negative electrode.

Then, a nonaqueous solvent was prepared by mixing fluoroethylene carbonate (FEC), ethylene carbonate (EC), and ethyl methyl carbonate (EMC) in a volume ratio of 1:1:6.

$LiPF_6$ was dissolved in this nonaqueous solvent to a concentration of 1.0 mol/liter to give a nonaqueous liquid electrolyte.

This nonaqueous liquid electrolyte was infiltrated into a separator (Celgard, LLC.; item number 2320; a thickness of 25 μm).

Celgard® 2320 is a polypropylene/polyethylene/polypropylene three-layer separator.

In a moisture-proof box controlled to have a dew point of −50° C., the positive electrode, negative electrode, and separator were assembled into a CR2032 coin-shaped battery.

Examples 2 to 16

The precursors were changed from those in Example 1.

Table summarizes the composition of the positive electrode active materials prepared in Examples 2 to 16.

Except for this, the procedure of Example 1 was repeated to synthesize the positive electrode active materials of Examples 2 to 16.

As in Example 1, the precursors in Examples 2 to 16 were weighed out and mixed in stoichiometric amounts.

For example, in Example 4, precursors $Li_2MnO_3$, $MnO_2$, $Li_4SiO_4$, $LiMnO_2$, and $LiNiO_2$ were weighed out and mixed in a molar ratio of 6/1/1/5/3.

For all of the positive electrode active materials of Examples 2 to 16, the space group was Fm-3m.

The positive electrode active materials of Examples 2 to 16 were each used as a component to fabricate a coin-shaped battery in the same way as in Example 1.

Comparative Example 1

$Li_2MnO_3$ and MnO were weighed out in a molar ratio $Li_2MnO_3$/MnO of 3/1.

These starting materials were put into a 45-cc zirconia container with an appropriate amount of 5-mm zirconia balls, and the container was tightly sealed in an argon glove box.

The container was removed from the argon glove box, and the contents were processed in a planetary ball mill at 600 rpm for 30 hours.

The resulting compound was analyzed by powder X-ray diffractometry.

The space group of the compound was Fm-3m.

The compound was then compositionally characterized using ICP emission spectrometry and inert gas fusion-infrared absorptiometry.

The composition of the compound was $Li_{1.2}Mn_{0.8}O_2$.

This compound was used as positive electrode active material to fabricate a coin-shaped battery in the same way as in Example 1.

Comparative Example 2

$Li_2CO_3$, $Mn_2O_3$, and $Nb_2O_5$ were weighed out in a molar ratio $Li_2CO_3/Mn_2O_3/Nb_2O_5$ of 6/3/1.

These starting materials were put into a 45-cc zirconia container with an appropriate amount of 3-mm zirconia balls, and the container was tightly sealed in an argon glove box.

The container was removed from the argon glove box, and the contents were processed in a planetary ball mill at 300 rpm for 10 hours.

The resulting mixture was fired at 950° C. for 10 hours in a stream of argon to give a compound.

The resulting compound was analyzed by powder X-ray diffractometry.

The space group of the compound was Fm-3m.

The compound was then compositionally characterized using ICP emission spectrometry and inert gas fusion-infrared absorptiometry.

The composition of the compound was $Li_{1.2}Mn_{0.6}Nb_{0.2}O_2$.

This compound was used as positive electrode active material to fabricate a coin-shaped battery in the same way as in Example 1.

Evaluation of the Batteries

The battery of Example 1 was charged to a voltage of 5.2 V with the cathodic current density set to 1.0 mA/cm².

The charged battery of Example 1 was discharged at a current density of 1.0 mA/cm² to a termination voltage of 2.0 V.

The initial energy density of the battery of Example 1 was 4900 Wh/L.

Then, the battery of Comparative Example 1 was charged to a voltage of 5.2 V with the cathodic current density set to 1.0 mA/cm².

The charged battery of Comparative Example 1 was discharged at a current density of 1.0 mA/cm² to a termination voltage of 2.0 V.

The initial energy density of the battery of Comparative Example 1 was 3800 Wh/L.

The energy densities of the coin-shaped batteries of Examples 2 to 16 and Comparative Example 2 were measured in the same way.

The results are summarized in Table.

TABLE

| | Composition | x + y | x/y | α/β | Energy density (Wh/L) |
|---|---|---|---|---|---|
| Example 1 | $Li_{1.2}Mn_{0.75}Si_{0.05}O_2$ | 2.0 | 1.5 | 15.0 | 4900 |
| Example 2 | $Li_{1.2}Mn_{0.75}B_{0.05}O_2$ | 2.0 | 1.5 | 15.0 | 4650 |
| Example 3 | $Li_{1.2}Mn_{0.75}P_{0.05}O_2$ | 2.0 | 1.5 | 15.0 | 4600 |
| Example 4 | $Li_{1.2}Ni_{0.15}Mn_{0.6}Si_{0.05}O_2$ | 2.0 | 1.5 | 15.0 | 4850 |
| Example 5 | $Li_{1.2}Co_{0.15}Mn_{0.6}Si_{0.05}O_2$ | 2.0 | 1.5 | 15.0 | 4800 |
| Example 6 | $Li_{1.2}Co_{0.15}Mn_{0.6}P_{0.05}O_2$ | 2.0 | 1.5 | 15.0 | 4550 |
| Example 7 | $Li_{1.2}Mn_{0.7}B_{0.05}Si_{0.05}O_2$ | 2.0 | 1.5 | 7.0 | 4630 |
| Example 8 | $Li_{1.2}Ni_{0.1}Mn_{0.6}Si_{0.05}P_{0.05}O_2$ | 2.0 | 1.5 | 7.0 | 4490 |
| Example 9 | $LiMn_{0.94}Si_{0.06}O_2$ | 2.0 | 1.0 | 15.7 | 3500 |
| Example 10 | $Li_{1.5}Mn_{0.47}Si_{0.03}O_2$ | 2.0 | 3.0 | 15.7 | 3200 |
| Example 11 | $Li_{0.5}Mn_{0.94}Si_{0.06}O_2$ | 1.5 | 0.5 | 15.7 | 2900 |
| Example 12 | $Li_{1.4}Mn_{0.84}Si_{0.06}O_2$ | 2.3 | 1.56 | 14.0 | 3820 |
| Example 13 | $Li_{1.33}Mn_{0.63}Si_{0.03}O_2$ | 2.0 | 1.99 | 21.0 | 3160 |
| Example 14 | $Li_{1.14}Mn_{0.71}Si_{0.05}O_2$ | 1.9 | 1.5 | 14.2 | 3760 |
| Example 15 | $Li_{1.2}Mn_{0.6}Si_{0.2}O_2$ | 2.0 | 1.5 | 3.0 | 2500 |
| Example 16 | $Li_{1.2}Mn_{0.4}Si_{0.4}O_2$ | 2.0 | 1.5 | 1.0 | 2000 |
| Comparative Example 1 | $Li_{1.2}Mn_{0.8}O_2$ | 2.0 | 1.5 | — | 3800 |
| Comparative Example 2 | $Li_{1.2}Nb_{0.2}Mn_{0.6}O_2$ | 2.0 | 1.5 | — | 2400 |

As seen from Table, the batteries of Examples 1 to 8 had initial energy densities much higher than those of the batteries of Comparative Examples.

In Examples 1 to 8, element(s) that readily forms covalent bonds and has a low atomic weight (B, Si, and/or Pi) was present dissolved in the compound. The resulting high discharge operating voltage and high capacity led to the improvement in energy density.

As presented in Table, furthermore, the initial energy densities of the batteries of Examples 2 and 3 were lower than that of the battery of Example 1.

This owes to the following facts: Si helped the substituted compound forming covalent bonds, increasing the discharge operating voltage of the battery; the substitution with Si, having an atomic weight lower than that of Mn, increased the amount of energy per mol the compound could provide; and Si can have a high affinity with oxygen because of its tetravalency. These led to the improvement in energy density.

In Table, furthermore, the initial energy density of the battery of Example 3 is lower than that of the battery of Example 2, and the initial energy density of the battery of Example 2 is lower than that of the battery of Example 1.

B, a trivalent element, although unlikely to form covalent bonds compared with Si, has an atomic weight lower than that of P and therefore is advantageous in terms of the amount of energy per mol. This led to an increase in discharge capacity, and therefore to the improvement in energy density. With P, the energy density was relatively high thanks to the pentavalency and higher potential of P to form covalent bonds than that of Si. However, P formed too many covalent bonds, preventing the redox reaction of oxygen during charging from proceeding sufficiently, thereby inhibiting the elimination of Li during charging. As a result, the energy density was lower than with Si or B.

In Table, furthermore, the initial energy density of the battery of Example 7 is lower than those of the batteries of Examples 1 and 2.

This is attributable to insufficient availability of conducting paths resulting from the relatively high total proportion of Si and B, electrochemically inert elements (the relatively small $\alpha/\beta$). Li was eliminated poorly, and this led to the decrease in energy density.

In Table, furthermore, the initial energy density of the battery of Example 8 is lower than those of the batteries of Examples 1, 3, and 4.

This is attributable to insufficient availability of conducting paths resulting from the relatively high total proportion of Si and P, electrochemically inert elements (the relatively small $\alpha/\beta$). Li was eliminated poorly, and this led to the decrease in energy density.

In Table, furthermore, the initial energy density of the battery of Example 9 is lower than that of the battery of Example 1.

In Example 9, in which x/y was 1, the availability of paths for Li to percolate was insufficient. Li ions therefore diffused poorly, and this led to the decrease in energy density.

In Table, furthermore, the initial energy density of the battery of Example 10 is lower than that of the battery of Example 1.

In Example 10, in which x/y was 3, the initial charging of the battery drew too much Li out of the crystal structure of the compound, destabilizing the crystal structure, thereby reducing the amount of Li that could be inserted during discharge. This led to the decrease in energy density.

In Table, furthermore, the initial energy density of the battery of Example 11 is lower than that of the battery of Example 1.

In Example 11, in which x+y was 1.5 and x/y was 0.5, the synthesis of the compound was deficient in Li, resulting in ordered arrangement Mn and Si. Paths for Li ions to percolate were insufficiently available, and Li ions diffused poorly. This led to the decrease in energy density.

In Table, furthermore, the initial energy density of the battery of Example 12 is lower than that of the battery of Example 1.

In Example 12, in which x+y was 2.3, oxygen was eliminated during charging because of anion vacancies in the initial structure, destabilizing the crystal structure of the compound. This led to the decrease in energy density.

In Table, furthermore, the initial energy density of the battery of Example 13 is lower than that of the battery of Example 1.

In Example 13, in which x/y was 1.99, the initial charging of the battery drew too much Li out of the crystal structure of the compound, destabilizing the crystal structure, thereby reducing the amount of Li that could be inserted during discharge. The amount of Me2, an element that readily forms covalent bonds and has a low atomic weight, insufficient for the amount of Me1 (the large $\alpha/\beta$) may also have contributed to the decrease in energy density.

In Table, furthermore, the initial energy density of the battery of Example 14 is lower than that of the battery of Example 1.

In Example 14, in which x+y was 1.9, the synthesis of the compound was slightly deficient in Li, resulting in ordered arrangement of Mn and Si. Paths for Li ions to percolate were insufficiently available, and Li ions diffused poorly. This led to the decrease in energy density.

As can be seen from these results of Examples 1 and 9 to 14, satisfying $1.9 \leq x+y \leq 2.3$ and $1.0 \leq x/y \leq 2.0$ in the composition formula $Li_xMe1_\alpha Me2_\beta O_2$ ($\alpha+\beta=y$) provides a further increase in initial energy density.

Additionally, as presented in Table, the initial energy densities of the batteries of Examples 15 and 16 were lower than those of the batteries of Examples 1 to 8.

In Examples 15 and 16, the amount of Si, an electrochemically inert element, was so large ($\alpha/\beta$ was so small) that no conducting paths were formed. Li was therefore eliminated poorly, and this led to the decrease in energy density.

In Table, furthermore, the initial energy densities of the batteries of Examples 15 and 16 were lower than that of the battery of Comparative Example 1.

Dissolving Si, an element that readily forms covalent bonds and has a low atomic weight, in the compound is usually effective to improve energy density. In Examples 15 and 16, however, the amount of Si, which is an electrochemically inert element, was so large compared with that of Mn, a metal, that no conducting paths were formed. Li was therefore eliminated poorly, and this led to the decrease in energy density.

Given these results, it is desirable in the composition formula $Li_xMe1_\alpha Me2_\beta O_2$ that $1<\alpha/\beta$, more desirably $3<\alpha/\beta$, even more desirably $7 \leq \alpha/\beta$. This provides a further increase in energy density. The parameter $\alpha/\beta$ has no upper limit, but desirably $\alpha/\beta<21$. This provides an additional increase in initial energy density.

In addition, it is obvious that similar advantages will be afforded even if Me1, in the composition formula $Li_xM1_\alpha Me2_\beta O_2$, is not Mn.

Positive electrode active materials according to the present disclosure can be used as positive electrode active materials for batteries such as secondary batteries.

What is claimed is:

1. A positive electrode active material for a battery, the positive electrode active material comprising a compound having a crystal structure of space group Fm-3m and represented by composition formula (1):

$$Li_xMe1_\alpha Me2_\beta O_2 \qquad (1)$$

where Me1 represents one or more elements selected from the group consisting of Mn, Ni, Co, Fe, Al, Sn, Cu, Mo, Bi, Ti, V, Cr, Y, Zr, Zn, Na, K, Ca, Mg, Pt, Au, Ag, Ru, Ta, W, La, Ce, Pr, Sm, Eu, Dy, and Er, Me2 represents one or more elements selected from the group consisting of B, Si, and P, and the following conditions are met:

$0<\alpha$;
$0<\beta$;
$0.5 \leq x/(\alpha+\beta) \leq 3.0$; and
$1.5 \leq x+\alpha+\beta \leq 2.3$.

2. The positive electrode active material according to claim 1, wherein
Me1 is Mn.

3. The positive electrode active material according to claim 1, wherein
Me2 is Si.

4. The positive electrode active material according to claim 1, wherein
x and y satisfy $1.0 \leq x/(\alpha+\beta) \leq 2.0$.

5. The positive electrode active material according to claim 1, wherein
x and y satisfy $1.9 \leq x+\alpha+\beta \leq 2.3$.

6. The positive electrode active material according to claim 1, wherein
$\alpha$ and $\beta$ satisfy $1<\alpha/\beta$.

7. The positive electrode active material according to claim 6, wherein $\alpha$ and $\beta$ satisfy $3<\alpha/\beta$.

8. The positive electrode active material according to claim 7, wherein $\alpha$ and $\beta$ satisfy $7 \leq \alpha/\beta$.

9. The positive electrode active material according to claim 1, wherein $\alpha$ and $\beta$ satisfy $\alpha/\beta<21$.

10. A battery comprising:
a positive electrode containing a positive electrode active material;
a negative electrode; and
an electrolyte, wherein
the positive electrode active material contains a compound having a crystal structure of space group Fm-3m and represented by composition formula (1):

$$Li_xMe1_\alpha Me2_\beta O_2 \qquad (1)$$

where Me1 represents one or more elements selected from the group consisting of Mn, Ni, Co, Fe, Al, Sn, Cu, Mo, Bi, Ti, V, Cr, Y, Zr, Zn, Na, K, Ca, Mg, Pt, Au, Ag, Ru, Ta, W, La, Ce, Pr, Sm, Eu, Dy, and Er, Me2 represents one or more elements selected from the group consisting of B, Si, and P, and the following conditions are met:

$0<\alpha$;
$0<\beta$;
$0.5 \leq x/(\alpha+\beta) \leq 3.0$; and
$1.5 \leq x+\alpha+\beta \leq 2.3$.

11. The battery according to claim 10, wherein:
the negative electrode contains a negative electrode active material that stores and releases lithium; and
the electrolyte is a nonaqueous liquid electrolyte.

12. The battery according to claim 10, wherein:
the negative electrode contains a negative electrode active material that stores and releases lithium; and
the electrolyte is a solid electrolyte.

* * * * *